United States Patent

[11] 3,620,384

| [72] | Inventor | Jerry W. Welker<br>Selma, Calif. |
|---|---|---|
| [21] | Appl. No. | 828,882 |
| [22] | Filed | May 29, 1969 |
| [45] | Patented | Nov. 16, 1971 |
| [73] | Assignee | Sperry Rand Corporation<br>New Holland, Pa. |

[54] TINE ARCH MECHANISM FOR A BALE WAGON
7 Claim, 9 Drawing Figs.

[52] U.S. Cl. ............................................. 214/6 B,
214/8.5 A
[51] Int. Cl. ............................................. B65g 57/32
[50] Field of Search .......................................... 214/6 B;
198/7 BL, 223

[56] References Cited
UNITED STATES PATENTS
422,353  2/1890  Paridy et al. .................. 198/223 X

| 3,502,230 | 3/1970 | Grey et al. ...................... | 214/6 B |
| 3,448,879 | 6/1969 | Van Der Lely ............... | 214/6 B |
| 3,478,897 | 11/1969 | Dykeman ..................... | 214/6 BA |
| 3,490,613 | 1/1970 | Eggenmuller et al. ........ | 214/6 B |
| 3,515,291 | 6/1970 | Grey et al. ..................... | 214/6 B |
| 3,521,762 | 7/1970 | Walters ......................... | 214/6 B |

*Primary Examiner*—Gerold M. Forlenza
*Attorneys*—Joseph A. Brown, John C. Thompson, James J. Kennedy and George C. Bower ABSTRACT: A tine arch mechanism for a bale wagon comprising a plurality of tine members pivotally suspended above the load-carrying bed and adapted to be engageable with successive tiers of bales received on the bed to prevent the bales from falling forward during the loading or transporting thereof, and movable out of engagement with the bale tiers to permit unloading of the bales from the bed.

PATENTED NOV 16 1971

INVENTOR.
JERRY W. WELKER

BY James J. Kennedy

ATTORNEY

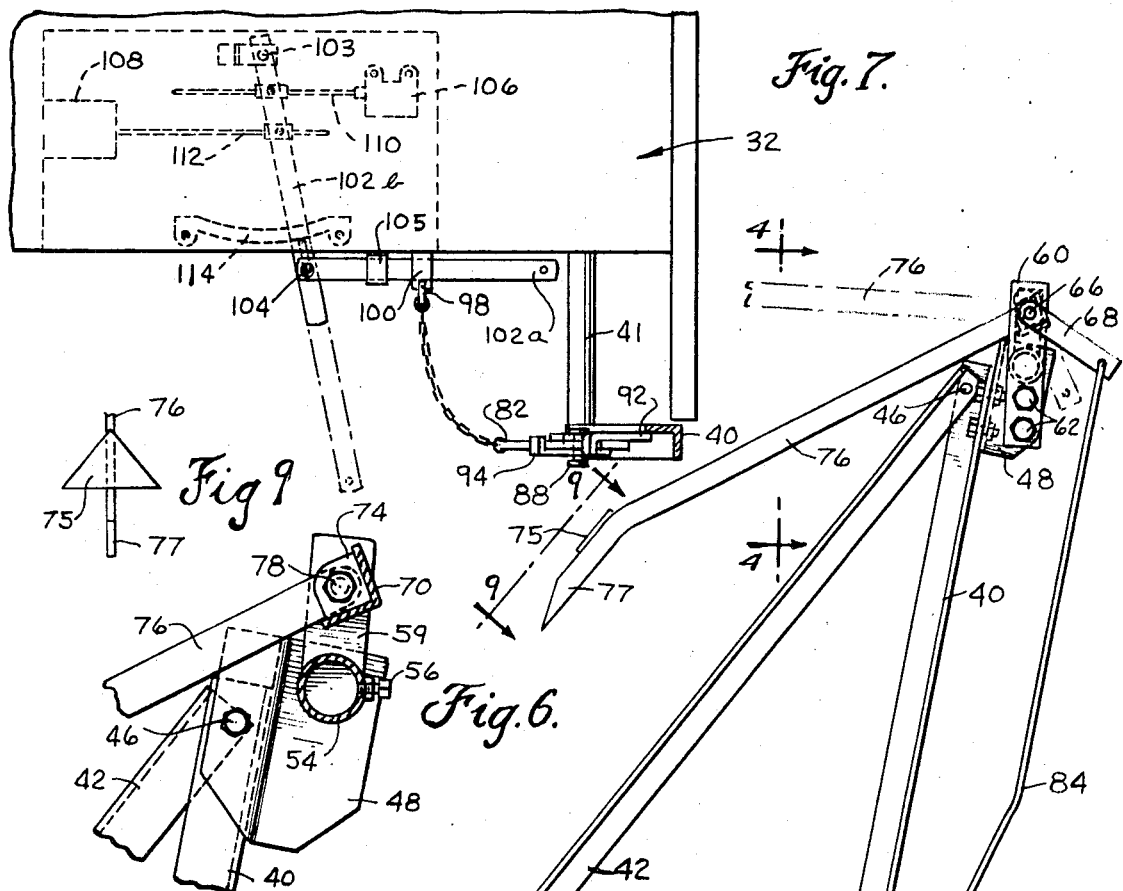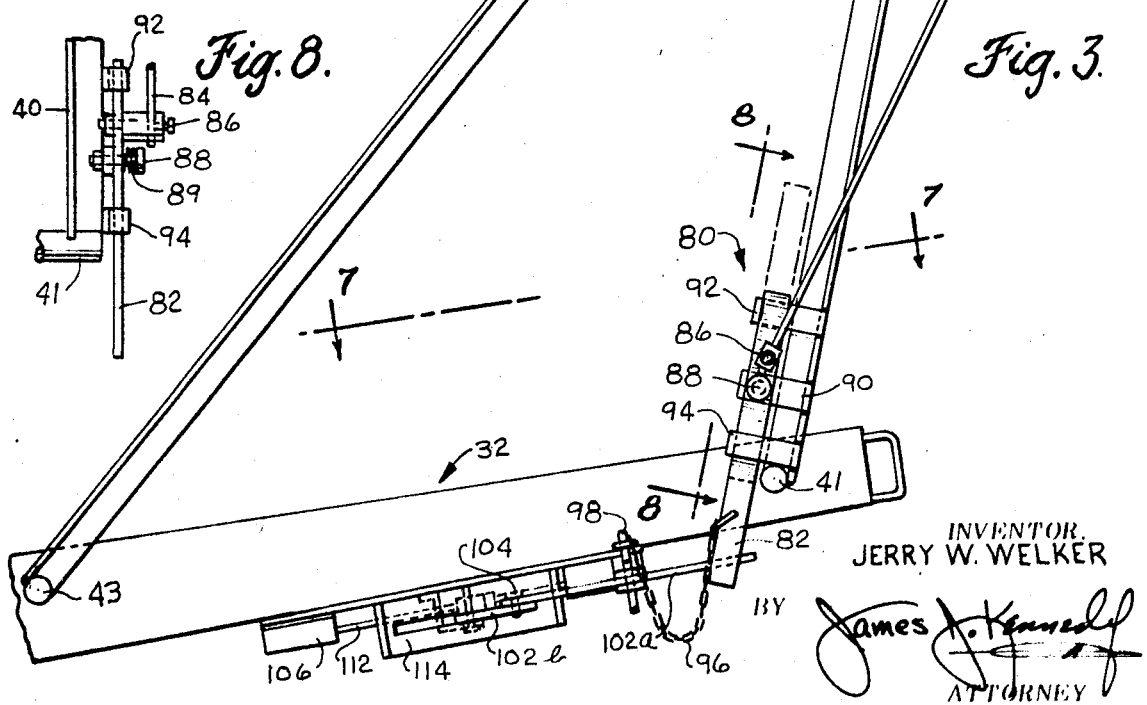

TINE ARCH MECHANISM FOR A BALE WAGON

BACKGROUND OF THE INVENTION

The present invention relates generally to agricultural machinery, and specifically to a bale wagon which is provided with means to increase the stability of the bale load on the bale-carrying bed as the wagon moves across the ground.

With the trend in farming practices toward increased mechanization, the automatic bale wagon, such as the type illustrated in U.S. Pat. No. 2,848,127 issued to Grey on Aug. 19, 1958, has been gaining in acceptance as an essential farm implement. The Grey wagon was adapted to pickup bales up from the ground and form them into stacks on wagon load bed. After accumulating successive bale tiers to form a completed bale stack on the load bed, the bale stack could be transported to a desired location for discharge from the wagon in a composite stack. Bale wagons have now evolved to the point where they not only can pick up individual bales in the field and stack them, or retrieve an entire stack, but they are also able to automatically unload the wagon one bale at a time. This type of wagon is shown and described in copending application Ser. No. 755,141 filed Aug. 26, 1968 now U.S. Pat. No. 3,502,230.

In using either bale wagon of the type hereinbefore described, it has been found that the bale tiers which have been placed in a vertical position on the load bed tend to fall forward as the wagon moves along the ground during the process of accumulating additional bale tiers, or after the wagon has been completely loaded and the wagon is moving to a discharge location. One solution to this problem has been to leave the transfer table in the up position after completing the loading of stacked bales on the wagon and while the wagon is being driven to the desired discharge location. This solution, however, solves only part of the problem since it is necessary to keep the transfer table in its near horizontal position during the loading operation to accumulate bale layers. As can be seen, therefore, the previously loaded bale tiers tend to fall forward from the load bed creating an irregular or loosely piled stack, neither of which is acceptable.

SUMMARY OF THE INVENTION

It is the primary object of this invention, therefore to provide a means for maintaining the position of the bale tiers on the load bed during the loading and transport operation.

Another object of this invention is to provide a pivotal tine mechanism which is mounted above the load bed, at the forward end thereof, and which is engageable with successive tiers of bales as they are received on the bed to prevent forward movement of the bale tiers relative to the bed.

A further object of this invention is to provide a tine mechanism which will pivot upwardly to permit accumulation of additional bale tiers, and which will return to an engaging position following receipt of a bale tier on the load bed to prevent any inadvertent forward movement of the bale tier from the bed.

Another object of the invention is to provide a tine mechanism which will be selectively operable by control means mounted on the wagon to pivot up out of the way of the bale tiers so that the wagon may unload successive tiers one bale at a time.

The objects of this invention are accomplished and realized by providing a support means on the bed means which comprises an arch mechanism having a plurality of pivotally mounted tines thereon which depend toward the bed means and are adapted to pivot upwardly upon introduction of successive tiers of bales to the bed and then downwardly under their own weight when the tiers are in place and rearwardly force directed against them by the bale tier stops so that the tines engage the tiers and prevent them from inadvertent forward motion with respect to the bed during successive loading or transport operations.

BRIEF DESCRIPTION OF THE DRAWINGS

FIG. 3 is an enlarged side view of the tine arch mechanism;

FIG. 6 is an enlarged cross section taken on the line 6—6 in FIG. 4;

FIG. 7 is a fragmentary plan view taken as indicated by the arrows 7—7 in FIG. 3; and FIG. 8 is a detail view of the tine pivotal connection taken as indicated by the arrows 8—8 in FIG. 3;

FIG. 9 is an enlarged view of the tine and stop plate mechanism.

DESCRIPTION OF THE PREFERRED EMBODIMENT

Figure 1:
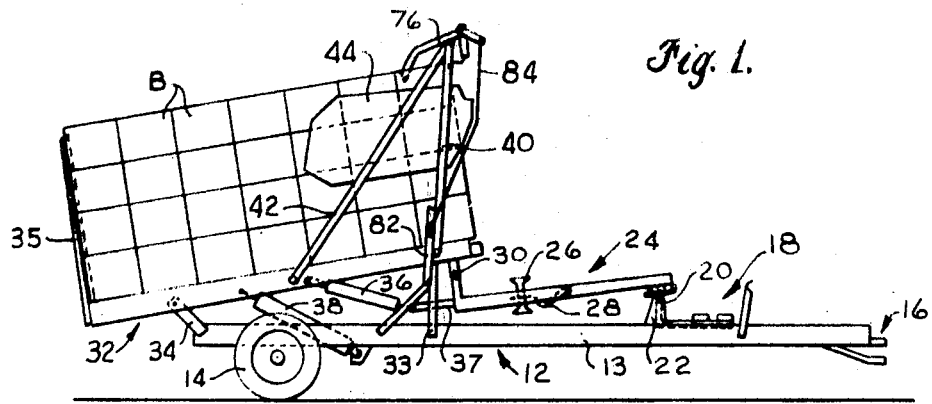
FIG. 1 is a schematic side elevational view with the second, or transfer table, in its normal down position and with the bale-carrying bed loaded with a complete stack of bales.
Figure 2:
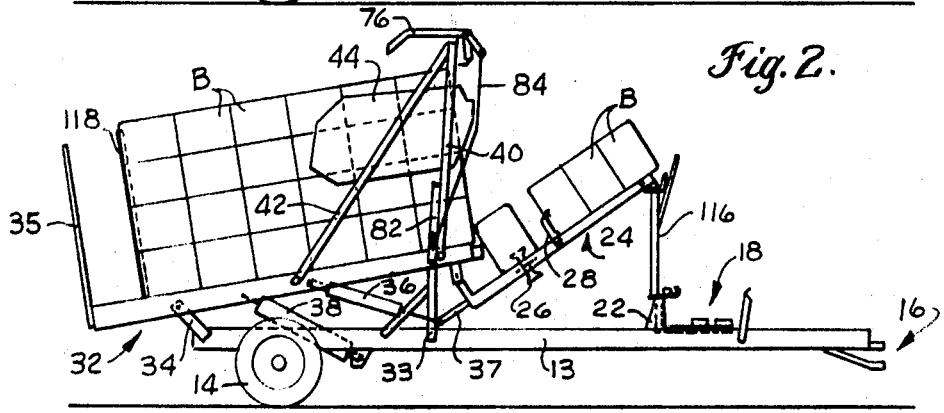
FIG. 2 is a schematic side elevational view with the transfer table raised to its single-bale unloading position, illustrating a tier of bales being unloaded from the transfer table.

Referring now generally to the drawings, and specifically to FIGS. 1 and 2, an automatic bale wagon 10, of the type described in Ser. No. 755,141, filed Aug. 26, 1968, and assigned to the present assignee, is comprised of a frame structure 12 having a pair of fore-and-aft extending channel sections 13, the sections being supported on a pair of wheels 14 (only one shown). A hitch assembly 16 is provided at the forward end of the wagon and adapts it to be hitched behind a tractor or other pulling vehicle, not shown, for movement over the ground.

Mounted on the frame structure 12, rearwardly of the hitch portion 16, is a bale-receiving table 18 which accepts and accumulates a series of individual bales which are directed thereto from the ground by a pickup mechanism, not shown, but well known in the art. The receiving table 18 is pivotally mounted with respect to the frame point 20 on support bracket 22, and after the requisite number of bales have been accumulated on the bed, the bed is automatically pivoted upwardly by means not shown so that the accumulated bales are deposited on a second, or transfer bed 24.

The transfer bed 24 is disposed on the wagon rearwardly of bed 18 in a generally horizontal position during normal operation, as shown in FIG. 1. The bed 24 is provided with a cross conveyor 26 and a plurality of bale hooks 28 whose function will be described hereinafter. The transfer bed, like the receiving bed, is adapted to accumulate successive bales, forming a tier of bales thereon, whereupon the completed tier of bales is automatically transferred to a load-carrying bed 32, by trip means not shown, which is disposed on the frame 12 rearwardly of the transfer bed.

The load bed 32 forms the pivotal support at point 30 for the transfer bed 24. Bed 32 is supported at its forward end by supports 33 which extend upwardly from the fore-and-aft extending beans 13 and at its rearward end by links 34, only one being shown which is fixed by one end to the frame structure and pivotally connected to the bed at the other end thereof. At the extreme rear of the bed are a plurality of upright fork members 35 which are adapted to provide additional support to a stack of bales on the bed during transport and during the stack discharging or retrieving operation.

A power cylinder 36 is disposed under the bed 32 and is connected by one end thereto, and by the other to a rearwardly extending link 37 which is fixed at one end to transfer table 24, as illustrated in FIGS. 1 and 2. Operation of cylinder 36, by the trip means not shown, causes the pivoting of the transfer table with respect to the load bed.

Another power cylinder 38 is operatively connected between the wagon frame 12 and the underside of the load bed 32. This cylinder is adapted to pivot the load bed with respect to the wagon frame to permit pivoting of the load bed to a vertical position (not shown) with respect to the frame structure for unloading of an entire bale stack or retrieving the stack.

At the forward end of the load bed 32 are a plurality of upstanding strut members 40 and 42, on each side of the load bed, as shown in detail in FIGS. 3 and 7. Each of the struts 40 and 42 is fixed at the lower end thereof to a mounting rod 41 and 43, respectively. The rods 41 and 43 are mounted on the load bed so as to be slidable transversely with respect thereto between an "in" position (not shown) and an "out" position (see FIG. 7). The forward struts 40 extend generally vertically upwardly, while the rearward struts 42 extend angularly upwardly with respect to the load bed, being joined to strut 41 by connecting means 46, as illustrated in FIGS. 3 and 6. Side shields 44 are fixed to the inner sides of the struts and are adapted to engage the bales on the load bed to provide additional stack stabilization during the stack formation, transport and unloading operations of the wagon. By making the struts and side shield transversely movable with respect to the load bed between the "in" and "out" positions, compensation can be made for long or short bales. The shields can be moved to provide the best support to the stack, yet without interfering with the bales as they are loaded on the bed.

A Z-shaped bracket 48 is fixed to the upper connected end of each of the struts 40 and 42. The bracket is fixed by one flange thereof to the struts by fastening means 50. Each bracket has a rod 52 fixed thereto and extending inwardly of the wagon transverse to the struts 40 and 42. The inward ends of each rod are adapted to be received in the open ends of a tube 54 and together with the tube form an arch over the forward portion of load bed 32. A setscrew 56, or the like, extends through each end of tube 54 and is adapted to contact and engage the rods 52 and lock them relative to the tube. These screws 56 must be loosened to move the struts and the side shields from their "in" position to their "out" position, or any place in between.

Figure 4:
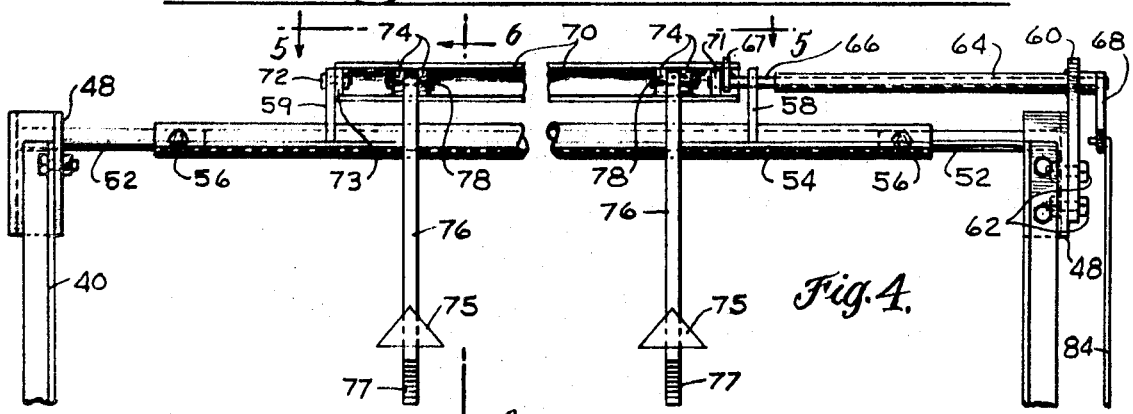
FIG. 4 is a broken out view looking in the direction of the arrows 4—4 in FIG. 3.
Figure 5:
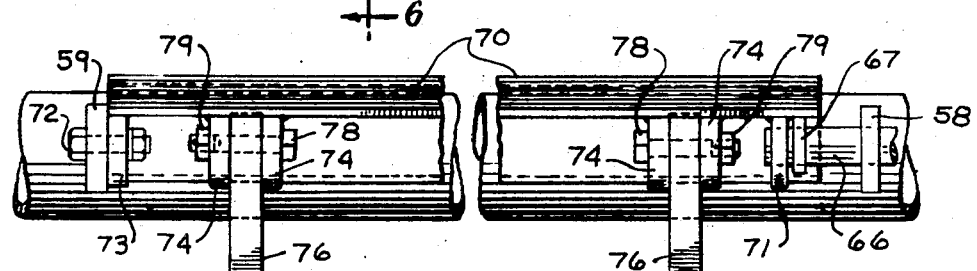
FIG. 5 is a fragmentary broken out view of the central portion of FIG. 4, shown enlarged and looking in the direction of the arrows 5—5 in FIG. 4.

A pair of spaced-apart ears 58 and 59 are fixed to the tube 54 by any suitable means such as welding, or the like, as shown in FIGS. 4 and 5. Each of the ears are provided with an aperture extending therethrough parallel to tube 54.

A bracket 60 is fixed to one of the Z-shaped brackets 48 by fastening means 62, as shown in FIGS. 3 and 4. The bracket 60 extends upwardly and is adapted to receive a tube 64 which passes through its upper end. The tube 64, fixed relative to the bracket by welding, or any other suitable means, extends inwardly of the wagon generally parallel to rod 52 and tube 54. A rod 66 extends through the tube, with the outer end of the rod fixed to a lever 68 which depends therefrom. Adjacent the other end of the rod 66, a second lever 67 is fixed to and extends from the rod. The lever 67 is adapted to contact an angle iron 70 which extends between the spaced ears 58 and 59. A tab 71 is welded or otherwise fixed to the angle iron 70 inwardly of the end thereof and serves as a pivotal support for the inner end of rod 66. A bolt 72, forming a pivotal connection, extends through tab 73 which is fixed to the other end of the angle iron. The bolt 72 is received in the aperture provided in ear 59. The rod 66 and bolt 72 cooperate to provide a pivotal mount for an angle iron 70.

As shown in FIGS. 4, 5 and 6, angle iron 70 is provided with a plurality of spaced-apart tabs 74 which are welded, or otherwise fixed to both flanges of the angle iron. The tabs 74 are arranged in pairs and are adapted to receive therebetween in pivotal relation tines 76 which extend rearwardly of the wagon, terminating in a substantially downwardly extending lower end 77. A triangular stop plate 75 is fixed to the tine 76 intermediate the end thereof and provides a limit for bale penetration. Bolts 78 extend through the tabs 74 and tines 76 and are secured by nuts 79 to provide a pivotal mount for the tines. In this manner the tines are independently mounted being pivotal with respect to angle iron 70, while at the same time being pivotal with the angle iron as rod 66 is turned as will hereinafter be described.

To permit selective controlling of the position of the tines with respect to the bale load bed, a control means 80, comprising a handle 82, having a rod 84 pivotally connected thereto by a rotatable lug 86, the rod 84 interconnecting the handle 82 and lever 68. The handle 82 is pivotally mounted on forward strut 40 by a bolt 88 and spring 89. The spring 89 biases the handle inwardly toward mounting lug 90 and locking lugs 92 and 94, shown in detail in FIGS. 3, 7 and 8.

A chain 96, or other suitable connecting member, is connected to handle 82 and extends toward the load bed. A pin 98, fixed to the other end of the chain, is adapted to be received in lugs 100 to lock rolling rack control handle 102 in the position shown in full lines in FIG. 7.

The control handle 102 is comprised of two sections 102a and 102b which are pivotally interconnected by bolt or pin 104 while section 102b is pivotally connected by pin 103 with respect to the wagon load bed 32. A locking collar 105 is slidably mounted on the control handle and is adapted to slip over both sections 102a and 102b when the handle is in the extended position, shown by the dotted lines in FIG. 7, to permit movement of the handle 102 as an integral unit. Movement of the handle 102 relative to a slotted guide 114 about its pivot point 103 causes actuation of control valves 108 and 106 through the connecting links 110 and 112. Actuation of the control valves causes actuation of a rolling rack 118 which is mounted on the load table for fore-and-aft movement for supporting the bale stack during loading and unloading thereof.

In operation, the wagon 10 is drawn through a field of bales and the bales are picked up one at a time and delivered to the receiving table 18. From the receiving table 18, accumulated bales are transferred to the intermediate transfer table 24 which accumulates a tier of bales before it is automatically pivoted or rotated upwardly about its pivotal mounting 30 to discharge the completed bale tier at the forward end of a third table or load bed 32. In the discharge position, the transfer table assumes a generally vertical disposition with respect to the inclined load bed.

The rolling rack 118 has been moved all the way forward and the first bale tier is placed thereagainst by the transfer table causing the rack 118 to move rearwardly a distance equal to the width of one bale B. The transfer bed then returns to its normal position to begin accumulating a second bale tier, etc.

As the first bale tier and all subsequent bale tiers are placed on bed 32, they pass under the tine arch mechanism causing tines 76 to pivot upwardly as the bales move rearwardly. During this operation, the tines 76 pivot independently of angle iron 70. Once the bale tier is in place, and the rearward motion of the bale tier stops, the tines engage the upper surface of the top layer of bales with the lower portion 77 which penetrates into the upper bales in which they come in contact. The stop 75 limits the penetration of the tine into the bale to prevent tearing the bale. The bales tend to move forward relative to the bed once the rearward force applied thereto is released, causing the depending portions 77 of the tines to penetrate to the furthest extent into the bales and retard further forward movement. In this manner, successive bale tiers are prevented from inadvertently moving forward on the wagon during subsequent successive loading operations, or during transport on filling the wagon. During successive loading operations the tines are free to pivot upwardly relative to the angle iron to permit passage of the bale tiers rearwardly, since the rearward motion of the bales will release the tines from holding engagement with the bales.

When it is desired to unload the wagon in a single-bale fashion, the transfer table 24 is raised to the inclined position shown in FIG. 2 and a table support 116 is put in place to hold the table in the inclined position. It is necessary to rotate the tines 76 upwardly out of engagement with the bale tiers, as shown in FIG. 2, so that the bales may be freely moved forwardly on the load bed by the rolling rack 118. To accomplish this, the locking chain 96 is removed from lugs 100 and the control handle 102 is assembled extended to the dotted line position illustrated in FIG. 7. With the chain removed, the handle 82 is moved out of engagement with the locking lugs 92, 94 and rotated to the up position (shown in dotted lines in FIG. 3) causing rod 84 to pivot lever 68, rod 66, lever 67, angle iron 70 and tines 76 to the up position shown in FIG. 2. Then, upon actuation of control handle 102, the rolling rack is moved forward, causing one bale tier at a time to fall over on the inclined transfer table. The bale hooks 28 are rotated upwardly and engage the bale tier to separate the lower bale layer from the rest of the tier, as shown in FIG. 2, so that cross conveyor 26 can move the lower bales laterally from the table for discharge from the wagon one bale at a time.

Upon completion of the unloading operation, the transfer table returned to its normal position, the tines are rotated downwardly and the control handles 82 and 102 are locked by chain 96. The wagon is then ready to begin another loading operation.

While this invention has been described in connection with a single embodiment thereof, it will be understood that the embodiment is capable of modification and that this application is intended to cover any variations, uses, or adaptations following, in general, the principles of the invention and including such departures from the present disclosures as come within known or customary practice in the art to which the invention pertains, and as fall within the scope of the invention or the limits of the appended claims.

Having thus described my invention, what I claim is:

1. A bale wagon comprising:
  a wheel-supported frame structure adapted for travel over the ground;
  bed means on said frame structure, said bed means being adapted to receive successive tiers of bales at one end thereof;
  support means are on said bed means; and
  means pivotally mounted on said support means for selected engagement with successive tiers of bales for preventing forward movement of said tiers relative to said bed means and for disengagement with said bale tiers to permit forward movement thereof relative to said bed means, said means pivotally mounted on said support means comprising retaining means pivotally mounted on said support means and a plurality of tines pivotally mounted on said retaining means, said tines being pivotal upwardly as successive tiers of bales are received on said bed means and downwardly into engagement with the bale tiers after said tiers are in place on the bed means.

2. A bale wagon, as recited in claim 1, wherein said support means comprises upstanding side members and connecting means extending between said upstanding side members, said support means forming an arch through which the bale tiers pass when being received on said bed means.

3. A bale wagon, as recited in claim 1, wherein said tines are provided with stop means adjacent the lower end thereof to limit the depth of penetration of said tines in said bales.

4. A bale wagon, as recited in claim 1, wherein control means operatively connected to said pivotally mounted means are provided for selectively actuating said pivotally mounted means from a position engageable with said bale tiers to a position out of engagement with said bale tiers for unloading of successive tiers of bales from said bed means.

5. A bale wagon comprising: a wheel-supported frame structure, adapted for travel over the ground; bed means on said frame structure, said bed means being adapted to receive successive tiers of bales at one end thereof; support means on said bed means, said support means comprising upstanding side members transversely movable with respect to said bed means and adjustable connecting means extending between said upstanding side members, said support means forming an arch through which the successive tiers of bales pass when being received on said bed means; means pivotally mounted on said support means, said means being selectively positionable for engagement and disengagement with successive tiers if bales on said bed means, said pivotally mounted means comprises retaining means pivotally mounted on said support means and a plurality of tines pivotally mounted on said retaining means, said tines pivoting upwardly with respect to said retaining means as successive tiers of bales are received on said bed means and downwardly with respect to said retaining means into engagement with said successive bale tiers when said tiers are positioned on said bed means, said tines preventing forward movement of said bale tiers relative to said bed means when said tines are in engagement therewith; and control means operatively connected to said pivotally mounted means for selectively actuating said pivotally mounted means into and out of engagement with the tiers of bales.

6. A bale wagon, as recited in claim 5, wherein said support means comprises upstanding side members transversely movable with respect to said bed means and adjustable connecting means extending between said upstanding side members, said means forming an arch through which the successive tiers of bales pass when being received on said bed means.

7. A bale wagon, as recited in claim 5, wherein said control means is operatively connected to said retaining means and said control means comprises a handle pivotally mounted on said support means, link means pivotally connected at one end to said handle and rod means connected by one end to said retaining means and by the other end to said link means, said handle being movable to rotate said tines from a bale-engaging position to a position out of engagement with said bale tiers to permit forward motion of said bale tiers relative to said bed means.

* * * * *